US012782373B2

(12) United States Patent
Guo et al.

(10) Patent No.: US 12,782,373 B2
(45) Date of Patent: Nov. 3, 2026

(54) METHOD OF AUTOMATICALLY TESTING THE SENSITIVITY OF A TYPE OF DUAL-CRYSTAL ULTRASONIC PROBE (ALSO CALLED ULTRASONIC TRANSDUCER) AND THE DETECTION SYSTEM WITH THE PROBES

(71) Applicant: NANJING TYCHO INFORMATION TECHNOLOGY CO., LTD, Nanjing (CN)

(72) Inventors: Qichang Guo, Nanjing (CN); Jinsong Mei, Nanjing (CN); Zhaogui Zhang, Nanjing (CN); Jiajie Li, Nanjing (CN); Le Gao, Nanjing (CN); Xiangchao Wang, Nanjing (CN); Yongfa Shao, Nanjing (CN); Lisong Huang, Nanjing (CN); Jialing Li, Nanjing (CN); Zhihao Bian, Nanjing (CN)

(73) Assignee: NANJING TYCHO INFORMATION TECHNOLOGY CO., LTD, Nanjing (CN)

( * ) Notice: Subject to any disclaimer, the term of this patent is extended or adjusted under 35 U.S.C. 154(b) by 264 days.

(21) Appl. No.: 18/707,453

(22) PCT Filed: Feb. 28, 2023

(86) PCT No.: PCT/CN2023/078641

§ 371 (c)(1),
(2) Date: May 3, 2024

(87) PCT Pub. No.: WO2023/202222

PCT Pub. Date: Oct. 26, 2023

(65) Prior Publication Data

US 2025/0003998 A1 Jan. 2, 2025

(30) Foreign Application Priority Data

Apr. 19, 2022 (CN) ........................ 202210410527.6

(51) Int. Cl.
*G01N 35/00* (2006.01)
*G01N 29/04* (2006.01)
(Continued)

(52) U.S. Cl.
CPC ....... *G01N 35/00623* (2013.01); *G01N 29/04* (2013.01); *G01N 29/24* (2013.01);
(Continued)

(58) Field of Classification Search
CPC .. G01N 35/00623; G01N 29/04; G01N 29/24; G01N 29/346; G01N 2291/023;
(Continued)

(56) References Cited

FOREIGN PATENT DOCUMENTS

JP 2008082864 A * 4/2008

* cited by examiner

*Primary Examiner* — Brandi N Hopkins
(74) *Attorney, Agent, or Firm* — MUNCY, GEISSLER, OLDS & LOWE, P.C.

(57) ABSTRACT

An automatic sensitivity testing method for a dual-crystal ultrasonic probe and a flaw detection system does not require a standard test block. An emitter and an echo pole of the dual- crystal ultrasonic probe emit and receive interface waves independently of each other. The wafer of the emitter or the echo pole generates an ultrasonic wave. The end face of the dual-crystal ultrasonic probe performs emission to form an interface wave. The interface wave being received by the wafer generates the ultrasonic wave. Alternatively, the emitter and the echo pole of the dual-crystal ultrasonic probe are in parallel to form an emitting and echo pole. The wafer emitting the echo pole generates ultrasonic waves. The end face of the dual-crystal ultrasonic probe performs emission to form an interface wave, which is received by the wafer emitting the echo pole.

5 Claims, 6 Drawing Sheets

(51) Int. Cl.
*G01N 29/24* (2006.01)
*G01N 29/30* (2006.01)
*G01N 29/34* (2006.01)

(52) U.S. Cl.
CPC ..... *G01N 29/346* (2013.01); *G01N 2291/023* (2013.01); *G01N 2291/0289* (2013.01); *G01N 2291/102* (2013.01)

(58) Field of Classification Search
CPC ..... G01N 2291/0289; G01N 2291/102; G01N 29/30; G01N 29/2443; G01N 29/069; G01N 29/043; G01N 29/34; G01N 29/4463; G01N 29/041; G01N 2291/0234; G01N 2291/044; G01N 29/223; G01N 29/343; G01N 2291/0428; G01N 29/0663; G01N 29/26; G05B 19/0423; G01S 15/8954; G01S 7/5206; A61B 8/13
USPC ........................................................... 73/1.82
See application file for complete search history.

METHOD OF AUTOMATICALLY TESTING THE SENSITIVITY OF A TYPE OF DUAL-CRYSTAL ULTRASONIC PROBE (ALSO CALLED ULTRASONIC TRANSDUCER) AND THE DETECTION SYSTEM WITH THE PROBES

TECHNICAL FIELD

The present invention is in the field of ultrasonic wave nondestructive flaw detection, and particularly relates to a sensitivity automatic testing method for a dual-crystal ultrasonic probe (also called an ultrasonic transducer) and a flaw detection system thereof.

BACKGROUND OF TECHNOLOGY

The sensitivity of existing traditional dual-crystal ultrasonic probes requires the use of standard test blocks for sensitivity test (as shown in FIG. 2). This method is applicable to the sensitivity testing of a small number of indoor dual-crystal ultrasonic probes. There are existing mature standards and methods as follows: when a dual-crystal ultrasonic probe works in pitch-catch mode, the right-side emission wafer transmits ultrasonic wave to the standard test block through a wedge, and when the artificial standard defect position is reached, the ultrasonic wave is reflected and transmitted to the left-side receiving wafer such that the defect of artificial standard test block can be detected. The ability to test manual standard defects represents the sensitivity of the dual-crystal ultrasonic probe and flaw detection system.

However, in the case of involving a large number of probes and in outdoor circumstance, it is difficult to adopt the above-mentioned traditional classical testing method, especially with the development of the railway operation when the train wheel flaw detection test has to be performed on the daily basis with a online detection system which is a breakthrough in the application of ultrasonic testing. The online flaw detection system includes a large number of ultrasonic probes (hundreds or even more). If the above-mentioned conventional method is used for sensitivity test of the probe and detection systems, the testing time is relatively long, which is not compliant with the requirements of short period of down time for maintenance.

Therefore, in this case, there is requirements for a rapid, no personnel to be at site, and automatic method of testing the sensitivity of a dual-crystal ultrasonic probe and the flaw detection system thereof, so as to solve the problem of daily use of the current through-type flaw detection system.

SUMMARY OF THE INVENTION

It is an object of the present invention to provide a method of automatically testing the sensitivity of a type of dual-crystal ultrasonic probe (also called ultrasonic transducer) and the detection system with the probes, with which to automatically test the sensitivity of the dual-crystal ultrasonic probe and the flaw detection system with the probes rapidly without using a standard testing block.

The technical solution adopted by the present invention for solving the technical problem is as follows.

A method of automatically testing the sensitivity of a type of dual-crystal ultrasonic probe (also called ultrasonic transducer) and the detection system with the probes is adopted, wherein the standard testing block is not required; and an emitting, echoing wave and its interface waves are independently one another: a wafer of the emitter or the echo pole generating an ultrasonic wave, at the end face of the dual-crystal ultrasonic probe performing emission to form an interface wave, and the interface wave being received by the wafer generating the ultrasonic wave;

Or, the emitter and the echo pole of the dual-crystal ultrasonic probe being in parallel to be an emitting and echo pole; and the wafers of the emitting and echo pole generating an ultrasonic wave, and the end face of the dual-crystal ultrasonic probe performing emission to form an interface wave, which is received by the wafers of the emitting and echo pole.

Further, the steps of the method are as follows:

(1) the emitter, the echo pole, or the emitting and echo pole of the dual-crystal ultrasonic probe emitting ultrasonic waves, an interface wave being formed due to the presence of end faces of the emitter, the echo pole, or the emitting and echo pole, and wave amplitudes and gain values of respective interface waves at this time being recorded;

(2) when the wave amplitudes of the interface waves of the emitter, the echo pole, or the emitting and echo pole are respectively the same as previously set wave amplitudes reference amplitudes of the dual-crystal ultrasonic probe, difference values between the gain values of the emitter, the echo pole, we determine the difference between the gain value of the emitter, echo pole, or emitter echo pole at this time and the preset gain reference value of the dual-crystal ultrasonic probe;

(3) when sensitivity self-checking is performed, firstly the gain value of the emitter, the gain value of the echo pole, or the gain value of the emitting and echo pole being respectively reduced by the respective difference values in point (2) above until the wave amplitudes of the emitter, the echo pole, or the emitting and echo pole respectively reaching the reference amplitudes, and then it is considered that the sensitivity of the dual-crystal ultrasonic probe is qualified; and (4) upon the completion of self-checking, the gain value of the probe being restored to the gain of the dual-crystal ultrasonic probe and the flaw detection system before the self-checking. Further, step (2) includes:

continuously reducing the gain value of the emitter based on the wave amplitude of the emitter in point (1) above, so that the wave amplitude of the emitter reaches the reference amplitude, and recording a gain value at this time as S4; and comparing S4 with the reference gain value to obtain a difference value ΔS1 of the emitter;

or, continuously reducing the gain value of the echo pole based on the wave amplitude of the echo pole in point (1) above, so that the wave amplitude of the echo pole reaches the reference amplitude, and recording the gain value at this time as S5; and comparing S5 with the probe reference gain value to obtain a difference value ΔS2 of the echo pole;

or, continuously reducing the gain value of the emitting and echo pole based on the wave amplitude of the emitting and echo pole in point (1) above, so that the wave amplitude of the emitting and echo pole reaches the reference wave amplitude, and recording the gain value at this time as S6; and comparing S6 with the reference gain value to obtain a difference value ΔS3 of the echo pole.

Further, in step (3), firstly the gain value of the emitter, the gain value of the echo pole, or the gain value of the emitting and echo pole is respectively reduced by respective difference values in point (2) above, and repeat operations in point (1) above until the wave amplitudes of the emitter, the echo pole, or the emitting and echo pole respectively reach the reference amplitudes, and then it is considered that the sensitivity of the dual-crystal probe and the flaw detection system is qualified. Further, dual-crystal ultrasonic probes of the flaw detection system independently perform steps of the automatic testing method.

Further, before the sensitivity automatic testing method is started, the sensitivity of the dual-crystal ultrasonic probe and a flaw detection system thereof is detected by using an artificial standard defect of a standard test block, and the wave height amplitude and the probe gain value at this time are recorded as the wave height reference amplitude and the probe gain reference value. A sensitivity automatic testing method for a dual-crystal ultrasonic probe and a flaw detection system thereof, uses the interface wave of the dual-crystal ultrasonic probe itself when working, i.e. it takes a part of the dual-crystal ultrasonic probe itself (usually the organic glass of itself) as a test block, and does not use the traditional standard test block. In particular, one wafer of the dual-crystal ultrasonic probe generates ultrasonic waves which are reflected by the organic glass end face of the dual-crystal ultrasonic probe to form interface waves, and the interface waves are then received by the wafer.

The sensitivity self-checking of the dual-crystal ultrasonic probe and the flaw detection system thereof is performed through the interface wave generated by the end face of the organic glass; the dual-crystal ultrasonic probe works in a one-emitting and one-receiving mode; during normal operation, the interface wave cannot be received due to the characteristics of the dual-crystal ultrasonic probe; when entering the self-checking mode, on the circuit design, the emission wafer and the receiving wafer of the dual-crystal ultrasonic probe emit and receive ultrasonic signals independently, as shown in FIGS. 1, 3, 4, and 5.

Compared to the prior art, the advantageous effects of the present invention are as follows.

(1) By using the interface wave for self-checking the sensitivity of the ultrasonic probe and the flaw detection system, it is possible to perform rapid and efficient probe self-checking and save time, especially in cases where a lot of probes are used for testing equipment on the spot, such as the trackside dynamic flaw detection testing equipment applied in the field of rail transit.

(2) It provides a simple and effective means to judge the sensitivity of a dual-crystal probe or a flaw detection system of large ultrasonic flaw detection equipment.

(3) The present invention is a supplement and improvement to the sensitivity testing of a conventional ultrasonic flaw detection system, and adapts to the current development needs of nondestructive flaw detection of railway wheels into the sector of daily operation.

Among them, 1, 2, 3, and 4 are switch contact points (on-off components and parts such as relays can be used), 5 is a controller, 6 is an emitter, 7 is an ultrasonic control unit (used for generating ultrasonic excitation high voltage and displaying echo, and it can also be replaced by an ultrasonic detector), 8 is an transmitting line, 9 is an echo line, 10 is an transmitting line port, 11 is an echo line port, 12 is an echo pole, 13 is a standard test block, and 14 is a dual-crystal ultrasonic probe.

DETAILED DESCRIPTION OF THE INVENTION

The present invention will be described below in further detail with reference to the attached drawings and examples.

Figure 1:
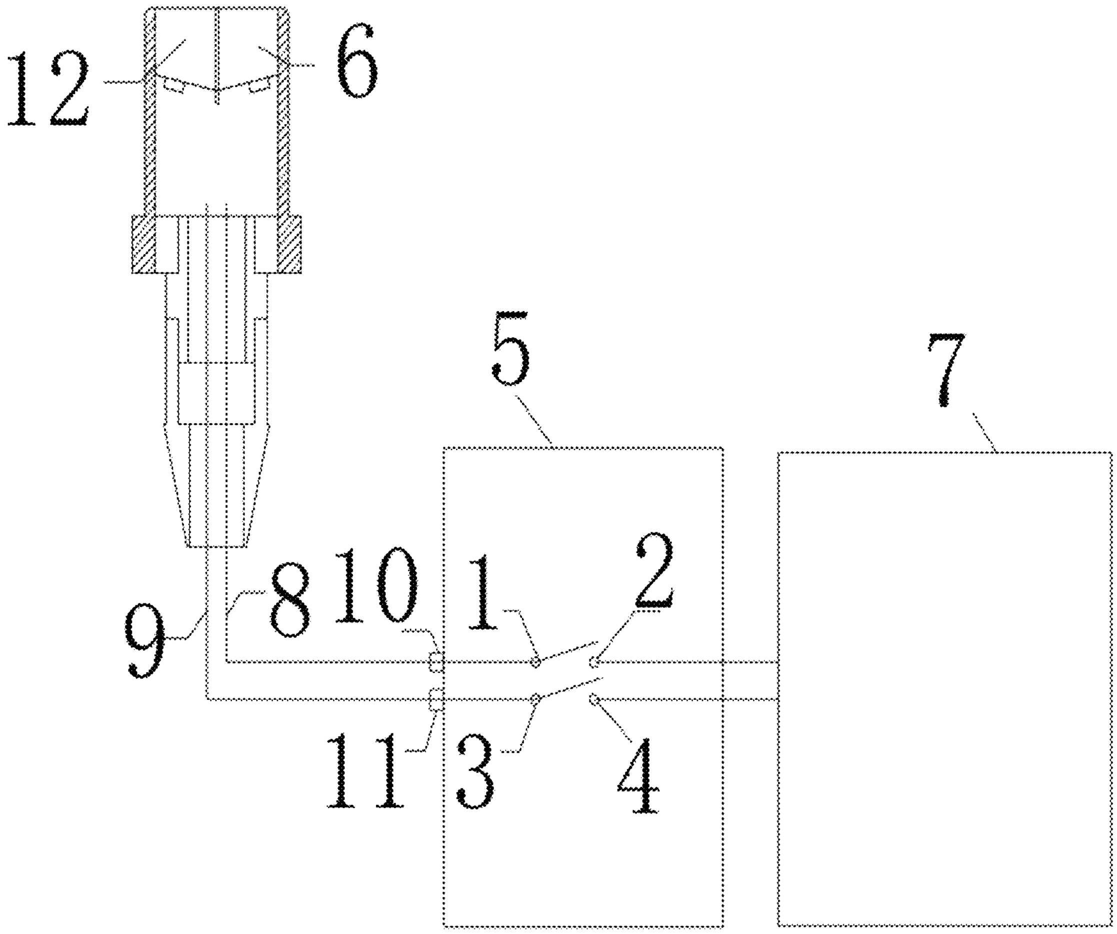
FIG. 1 is a schematic diagram of the principles of the present invention.
Figure 2:
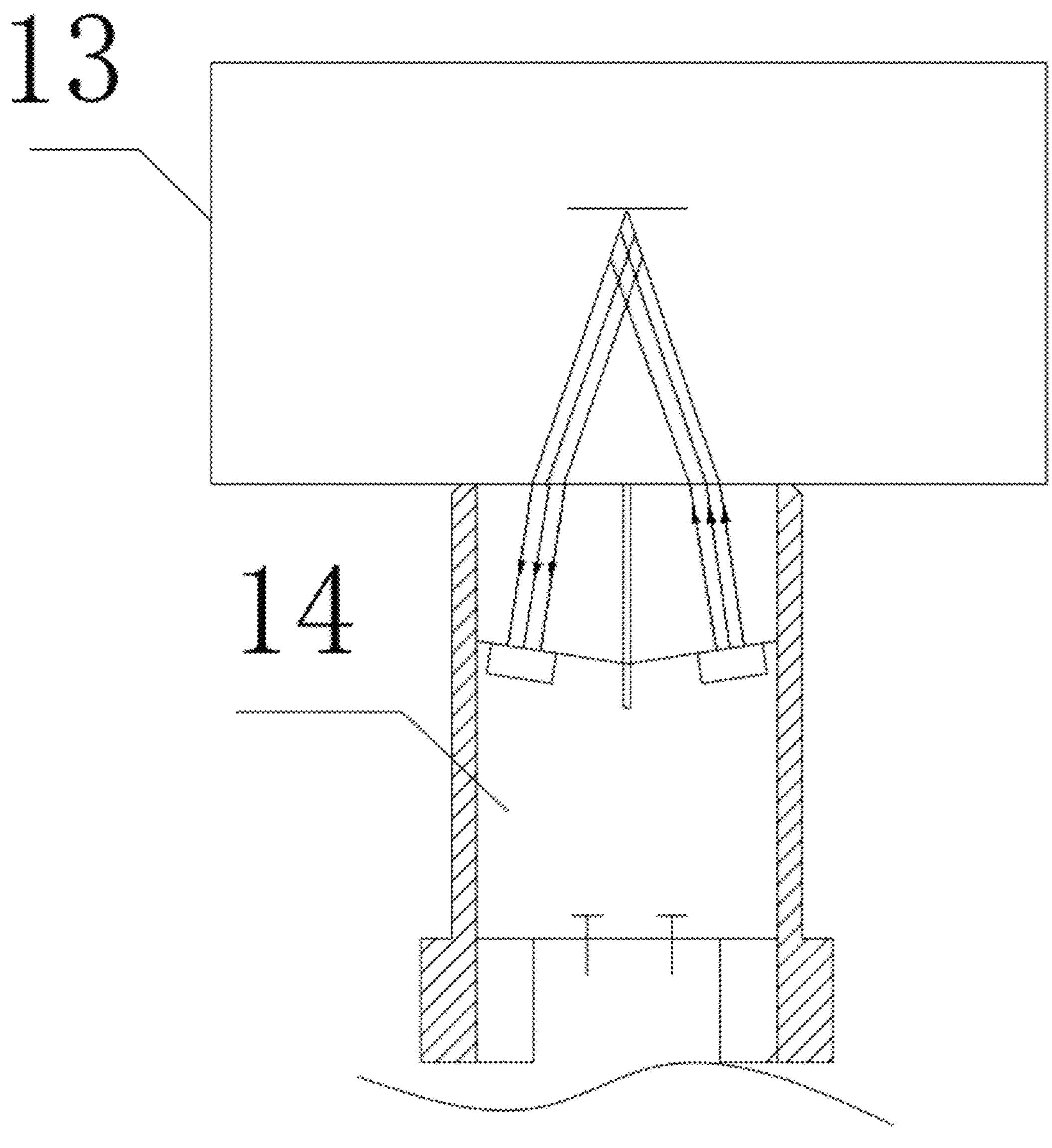
FIG. 2 is a schematic diagram of the sensitivity of a dual-crystal probe tested by using a standard test block.
Figure 3:
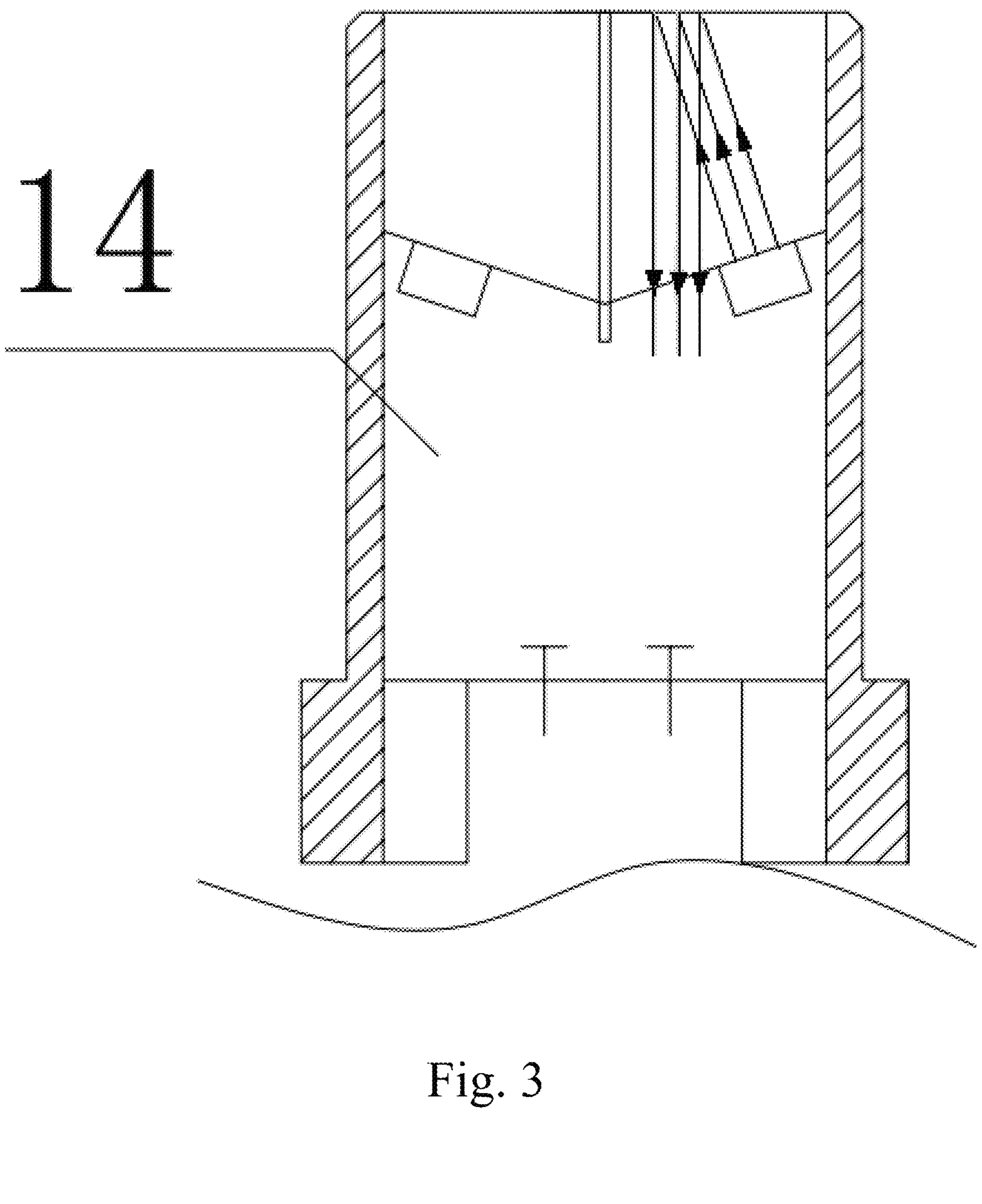
FIG. 3 is a schematic diagram of a self-checking wave of an emitter of the present invention.
Figure 4:
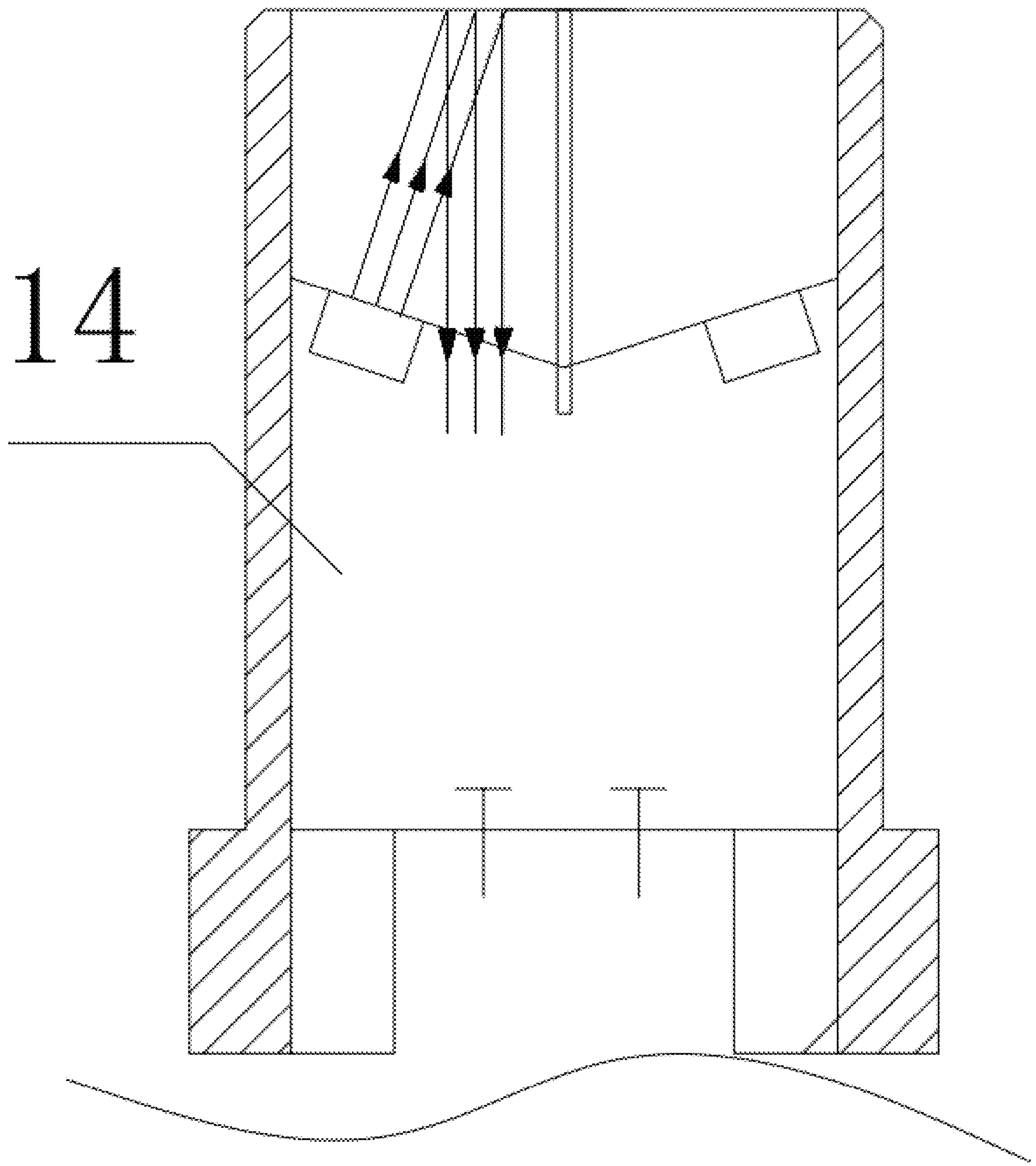
FIG. 4 is a schematic diagram of a self-checking wave of an echo pole of the present invention.

The principle of a sensitivity automatic testing method for a dual-crystal ultrasonic probe and a flaw detection system in this example is as follows: a part of a dual-crystal ultrasonic probe 14 itself (the wedge located on its end face is generally organic glass) is regarded as a test block, and the interface wave of the dual-crystal ultrasonic probe 14 is used. An emitter 6 (mainly the emission wafer, wedge, cable, and related circuits) of the dual-crystal ultrasonic probe 14 emits the ultrasonic wave (at this time, the echo pole 12 is disconnected), and the ultrasonic wave forms an interface wave on the organic glass of the emitter 6 (as shown in FIG. 3). At this time, the emitter 6 stops emitting the ultrasonic wave and receives the interface wave. By the same reasoning, an echo pole 12 (mainly the receiving wafer, wedge, cable and relevant circuits) emits an ultrasonic wave (at this time, the emitter 6 is disconnected); the ultrasonic wave forms an interface wave on the organic glass of the echo pole 12; at this time, the echo pole 12 stops emitting the ultrasonic wave, and receives the interface wave of the echo pole 12 (as shown in FIG. 4), namely, the echo pole 12 and the emitter 6 respectively emit and receive the interface waves in a mutually independent manner; and the amplitude size of the interface wave is used to perform sensitivity self-checking on the ultrasonic-wave dual-crystal probe and the flaw detection system thereof.

Example 1

Figure 6:
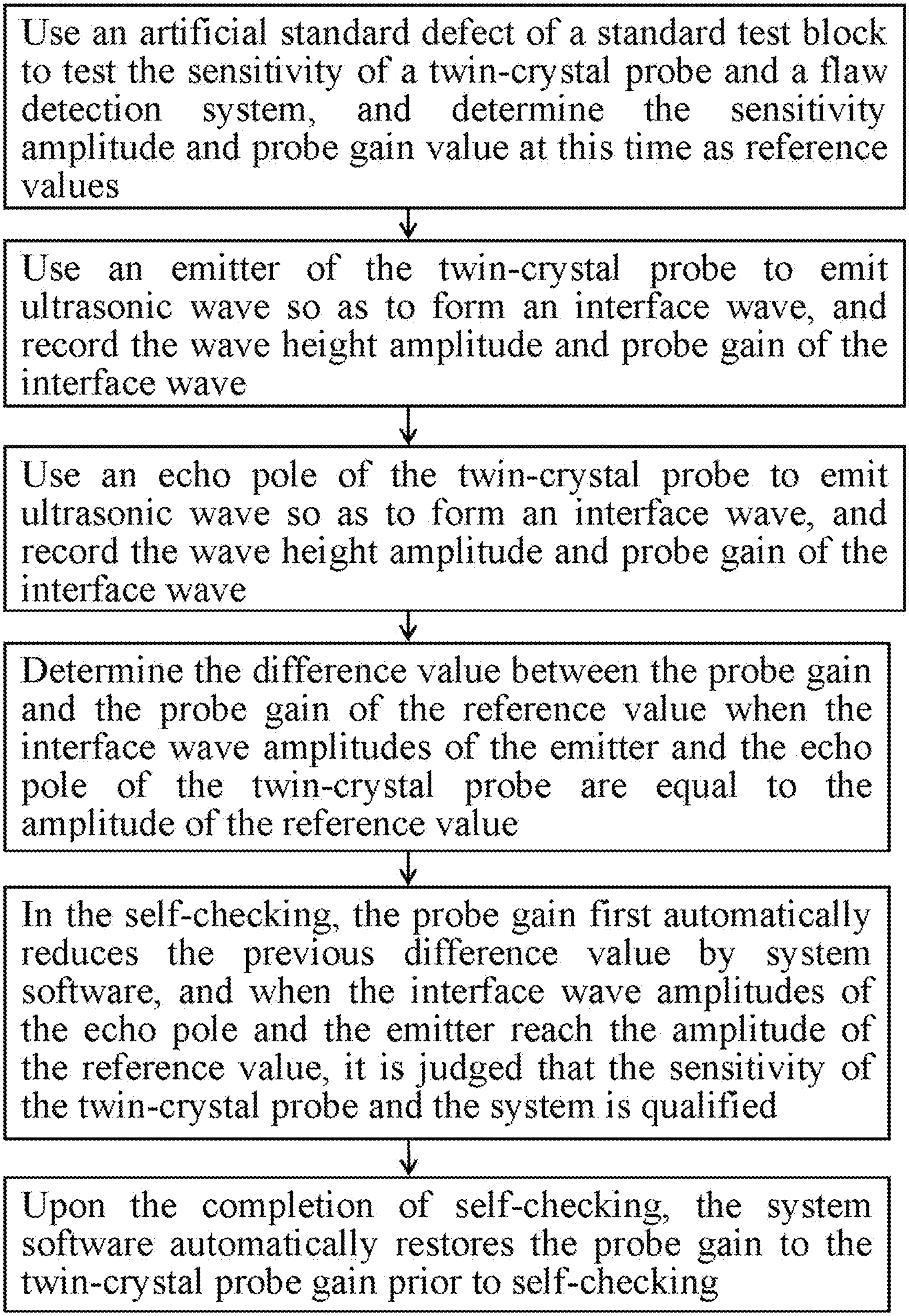
FIG. 6 is a flowchart of the method of the present invention.

The working process of a automatic sensitivity testing method for a dual-crystal ultrasonic probe and a flaw detection system in this example is as shown in FIG. 6:

step 1: using a standard test block with an artificial standard defect (such as q3 flat-bottom hole, the specific defect is determined according to the flaw detection standard) to test the sensitivity of the dual-crystal ultrasonic probe and flaw detection system, recording the sensitivity amplitude (wave height amplitude) at the time as H1 (set as reference value), and recording the probe gain value S1 (set as reference value) at this time;

step 2: using the emitter 6 of the dual-crystal ultrasonic probe 14 to emit an ultrasonic wave (at this time, the echo line of the echo pole 12 is disconnected), wherein an interface wave is formed due to the presence of the organic glass of the emitter 6 itself (as shown in FIG. 3), and the emitter 6 receives the interface wave through a special circuit, and at this time, the wave height amplitude is H2 and the probe gain is S2;

step 3: emitting the ultrasonic wave by the echo pole 12 of the dual-crystal ultrasonic probe 14 (at this time, the emission line of the emitter 6 is disconnected), wherein an interface wave is formed due to the presence of the organic glass of the echo pole 12 itself (as shown in FIG. 4), and the echo pole 12 receives the interface wave through a special circuit, and at this time, the wave height amplitude is H3 and the probe gain is S3;

step 4: continuously reducing the probe gain based on the wave height amplitude H2 in step 2, so that it reaches the wave height amplitude H1 in step 1, and recording the probe gain value at this time as S4;

step 5: continuously reducing the probe gain on the basis of the wave height amplitude H3 in step 3, so that it reaches the amplitude wave height H1 in step 1, and recording the probe gain value at this time as S5;

step 6: comparing the different values between S4 and S1 to obtain ΔS1, and comparing the different values between S5 and S1 to obtain ΔS2; and step 7: prior to performing sensitivity self-checking of the dual-crystal ultrasonic probe and flaw detection system, automatically reducing the probe gains of emitter 6 and the echo pole 12, respectively, by the numerical values of ΔS1 and ΔS2 in step 5, wherein when the wave height amplitudes of the emitter 6 and the echo pole 12 reach H1, respectively, the dual-crystal probe and the flaw detection system are considered to have qualified sensitivity.

The self-checking process is the same as the above-mentioned step 2 and step 3, and the details are as follows:

(a) in the controller 5, the contact points 1 and 2 of the switch are connected (at this time, the contact points 3 and 4 are disconnected), the emitter 6 finishes emitting ultrasonic waves, the switch contact points 1 and 4 are connected (the contact points 2 and 3 are disconnected), and at this time, the emission line of the probe is used as the echo line, and the ultrasonic wave detection device receives the echo, so that the self-checking of the emitter 6 of the ultrasonic probe can be completed, as shown in FIG. 3; and (b) in the controller 5, the switch contact points 2 and 3 are conducted (the contact points 1 and 4 are disconnected), the echo line completes the act that the echo pole 12 emits ultrasonic waves, the switch contact points 3 and 4 are connected (the contact points 1 and 2 are disconnected), the echo line echoes, and the echo pole 12 self-checking is completed, as shown in FIG. 4.

Step 8: after the self-checking is completed, the system software automatically restores the probe gain to the probe gain of the dual-crystal ultrasonic probe and flaw detection system before the self-checking.

Example 2

Figure 5:
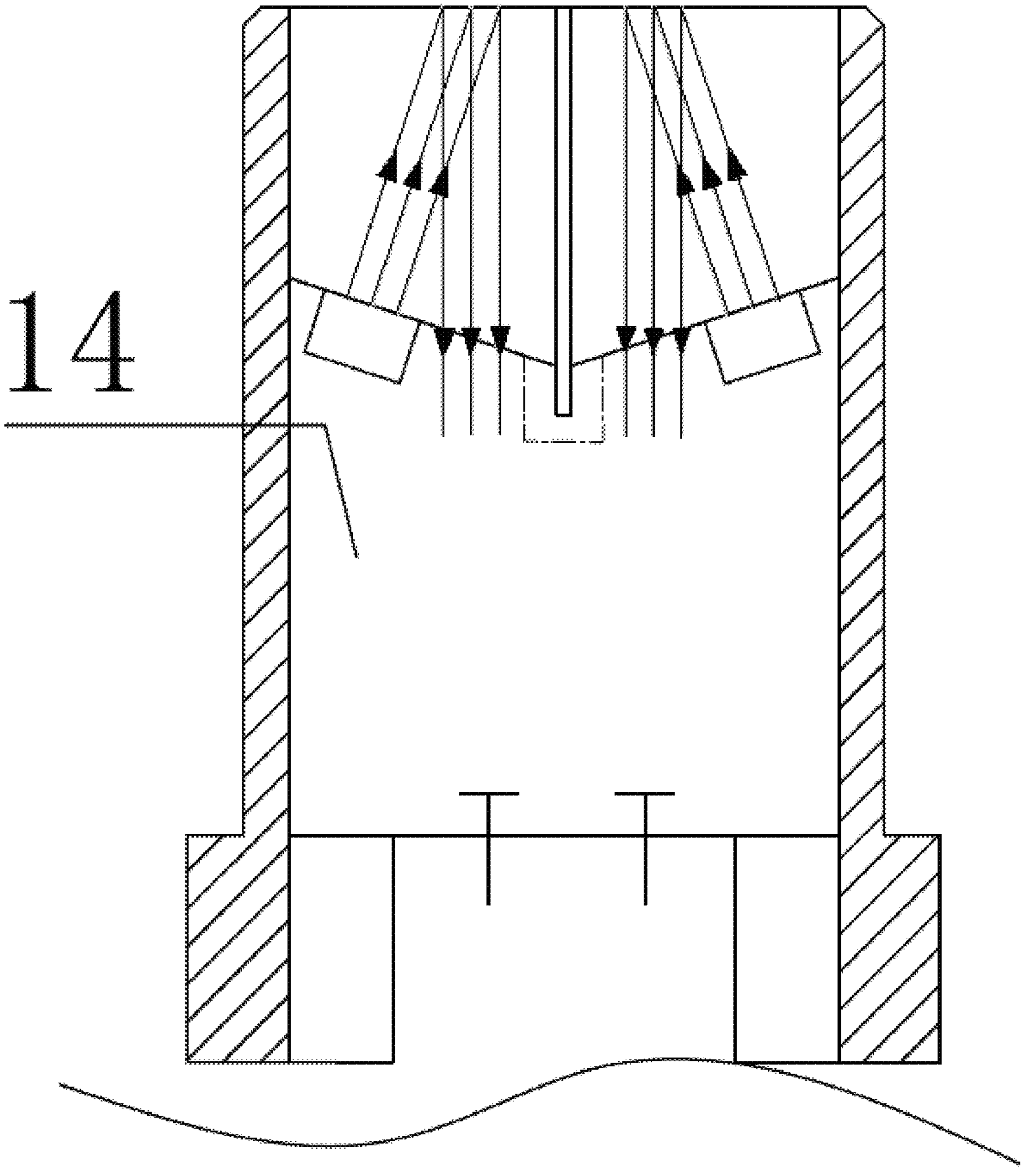
FIG. 5 is a schematic diagram of a self-checking wave of an emitting and echo pole formed by an emitter and an echo pole in parallel according to the present invention.

An automatic sensitivity testing method for a dual-crystal ultrasonic probe and a flaw detection system is carried out by using an emitting and echo pole formed by an emitter and an echo pole in parallel as shown in FIG. 5. The method has a flow substantially the same as in embodiment 1: step 1: using an artificial standard defect of a standard test block (such as q3 flat-bottom hole, the specific defect is determined according to the flaw detection standard) to test the sensitivity of the dual-crystal ultrasonic probe and flaw detection system thereof, recording the sensitivity amplitude (wave height amplitude) at the time as H1 (set as reference value), and recording the probe gain value S1 (set as reference value) at this time;

step 2: using an emitting and echo pole of the dual-crystal ultrasonic probe 14 to emit an ultrasonic wave, wherein an interface wave is formed due to the presence of the organic glass of the emitting and echo pole itself (as shown in FIG. 5), and the emitting and echo pole receives the interface wave through a special circuit, and at this time, the wave height amplitude is H6 and the probe gain is H6;

step 3: continuously reducing the probe gain based on the wave height amplitude H6 in step 2, so that it reaches the wave height amplitude H1 in step 1, and recording the probe gain value at this time as S6;

step 4: comparing the difference value between S6 and S1 to obtain Δ3;

step 5: prior to performing sensitivity self-checking of the dual-crystal ultrasonic probe and flaw detection system, automatically reducing the probe gains of the emitting and echo pole, respectively, by the numerical values of ΔS3, wherein when the wave height amplitudes of the emitting and the echo pole reach H1, respectively, and the dual-crystal probe and the flaw detection system thereof are considered to have qualified sensitivity; and step 6: after the self-checking is completed, the system software automatically restores the probe gain to value of the dual-crystal ultrasonic probe and flaw detection system before self-checking. The above explanation of the examples enables those skilled persons to implement or use the present invention. Various modifications to the examples are obvious to the professionals in the sector. The general principles defined herein can be implemented in other examples without departing from the spirit or scope of the present invention. Therefore, the present invention will not be limited to the examples shown herein. All technical solutions obtained through equivalent substitutions or equivalent transformations fall within the scope of protection of the present invention.

The invention claimed is:

1. An automatic sensitivity testing method for a dual-crystal ultrasonic probe and a flaw detection system, wherein the automatic sensitivity testing method does not require a standard test block; and wherein an emitter and an echo pole of the dual-crystal ultrasonic probe emit and receive interface waves independently of each other; a wafer of the emitter or the echo pole generating an ultrasonic wave, an end face of the dual-crystal ultrasonic probe performing emission to form an interface wave, and the interface wave being received by the wafer generating the ultrasonic wave;

or the emitter and the echo pole of the dual-crystal ultrasonic probe being in parallel to form an emitting and echo pole; and the wafer of the emitting and echo pole generating ultrasonic waves, and the end face of the dual-crystal ultrasonic probe performing emission to form an interface wave, which is received by the wafer of the emitting and echo pole, wherein the automatic sensitivity testing method comprises:

(1) using a wedge on an end face of the dual-crystal ultrasonic probe as a test block, the emitter, the echo pole, or the emitting and echo pole of the dual-crystal ultrasonic probe emitting ultrasonic waves, forming an interface wave due to presences of end faces of the emitter, the echo pole, or the emitting and echo pole, and recording wave amplitudes and gain values of respective interface waves;

(2) when the wave amplitudes of the interface waves of the emitter, the echo pole, or the emitting and echo pole are respectively the same as previously set wave height reference amplitudes of the dual-crystal ultrasonic probe and the flaw detection system, determining difference between the gain values of the emitter, the echo pole, or the emitting and echo pole, and determining a pre-gain reference value of the dual-crystal ultrasonic probe and the flaw detection system;

(3) performing sensitivity self-checking, reducing the gain values of the emitter, the echo pole, or the emitting and echo pole respectively by respective difference values in the step (2) until wave height amplitudes of the emitter, the echo pole, or the emitting and echo pole respectively reaching the wave height reference amplitudes, and considering that sensitivity of the dual-crystal ultrasonic probe and the flaw detection system is qualified; and (4) restoring the gain values of the dual-crystal ultrasonic probe to the pre-gain reference value used before the sensitivity self-checking.

2. The automatic sensitivity testing method for a dual-crystal ultrasonic probe and a flaw detection system according to claim 1, wherein a plurality of twin-crystal ultrasonic probes of the flaw detection system independently perform steps of the automatic testing method.

3. The automatic sensitivity testing method for a dual-crystal ultrasonic probe and a flaw detection system according to claim 1, wherein before the automatic sensitivity testing method is performed, the sensitivity of the dual-crystal ultrasonic probe and a flaw detection system is tested with a standard block with artificial defect, and the wave amplitude and the probe gain value at this time are recorded as the reference of the wave amplitude and the probe gain value.

4. The automatic sensitivity testing method for a dual-crystal ultrasonic probe and a flaw detection system according to claim 1, wherein the step (2) comprises:

continuously reducing the gain value of the emitter based on the wave amplitude of the emitter in (1), so that the wave amplitude of the emitter reaches the reference amplitude of the wave, and recording a gain value at this time as S4; and comparing S4 with reference value of the gain to obtain a different value ΔS1 of the emitter;

or, continuously reducing the gain value of the echo pole based on the wave amplitude of the echo pole in (1), so that the wave amplitude of the echo pole reaches reference amplitude of the wave, and recording the gain value at this time as S5; and comparing S5 with the reference of the probe gain values to obtain a difference value ΔS2 of the echo pole;

or, continuously reducing the gain value of the emitting and echo pole based on the wave amplitude of the emitting and echo pole in (1), so that the wave amplitude of the emitting and echo pole reaches the reference amplitude of the wave, and recording the gain value at this time as S6; and comparing S6 with the reference value of the probe gain to obtain a difference value ΔS3 of the echo pole.

5. The automatic sensitivity testing method for a dual-crystal ultrasonic probe and a flaw detection system according to claim 1, wherein in the step (3), firstly the gain value of the emitter, the gain value of the echo pole, or the gain value of the emitting and echo pole is respectively reduced by respective different values in (2), and operations in (1) are repeated until the wave amplitudes of the emitter, the echo pole, or the emitting and echo pole respectively reach the refremce amplitude of the wave, and then it is considered that the sensitivity of the dual-crystal probe and the flaw detection system is qualified.

* * * * *